US011293653B1

(12) United States Patent
Burnett

(10) Patent No.: US 11,293,653 B1
(45) Date of Patent: Apr. 5, 2022

(54) MAGNETICALLY SEALED AIR-CLEANER DOOR

(71) Applicant: Gregg W. Burnett, Royse City, TX (US)

(72) Inventor: Gregg W. Burnett, Royse City, TX (US)

( * ) Notice: Subject to any disclaimer, the term of this patent is extended or adjusted under 35 U.S.C. 154(b) by 774 days.

(21) Appl. No.: 16/161,997

(22) Filed: Oct. 16, 2018

Related U.S. Application Data

(60) Provisional application No. 62/734,583, filed on Sep. 21, 2018.

(51) Int. Cl.
*F24F 8/10* (2021.01)
*B01D 46/00* (2022.01)

(52) U.S. Cl.
CPC ............ *F24F 8/10* (2021.01); *B01D 46/0002* (2013.01); *B01D 2265/023* (2013.01); *B01D 2271/025* (2013.01)

(58) Field of Classification Search
None
See application file for complete search history.

(56) References Cited

U.S. PATENT DOCUMENTS

| | | | | |
|---|---|---|---|---|
| 3,246,456 A | * | 4/1966 | Sharp ...................... | F24F 13/28 55/481 |
| 3,782,411 A | * | 1/1974 | Turner ................ | F16K 17/0446 137/467 |
| 4,143,670 A | * | 3/1979 | Olson ..................... | F16K 17/38 137/72 |
| 4,521,234 A | * | 6/1985 | Peebles, Jr. ........ | B01D 46/0091 55/481 |
| 4,701,196 A | * | 10/1987 | Delany .............. | B01D 46/0002 55/481 |
| 4,773,922 A | * | 9/1988 | Ross .................. | B01D 46/0004 55/481 |
| 5,067,278 A | * | 11/1991 | Lyons ..................... | F16L 45/00 49/463 |
| 5,458,667 A | * | 10/1995 | Poggi, Jr. ............... | B01D 46/10 55/480 |
| 5,516,266 A | * | 5/1996 | Talaski ............... | F02M 37/0041 417/540 |
| 5,525,145 A | * | 6/1996 | Hodge ................. | B01D 46/001 96/17 |
| 5,901,502 A | * | 5/1999 | Rafalski ................ | F24F 13/029 49/463 |
| 5,944,860 A | * | 8/1999 | Mack ..................... | F24F 13/28 55/492 |

(Continued)

*Primary Examiner* — Christopher P Jones
*Assistant Examiner* — Phillip Y Shao
(74) *Attorney, Agent, or Firm* — Fogarty LLP

(57) ABSTRACT

A door for an air cleaner housing is disclosed. The door comprises a baseplate having a first side and a second side, a gasket attached to the first side of the baseplate, a backplate connected to the second side of the baseplate, and a front plate spaced apart from the backplate by spacers, wherein the baseplate, the backplate and the front plate are attached by a plurality of fasteners. Slots may be formed in the baseplate, and a magnet is positioned in each of the slots. The baseplate, the backplate, and the gasket dimensions may be adapted to fit within an opening in an air-cleaner housing. The magnets may be positioned to hold the door in position the housing opening. The gasket comprises a cellular urethane that seals the door to the housing to prevent air leaks.

16 Claims, 5 Drawing Sheets

(56) References Cited

U.S. PATENT DOCUMENTS

| | | | | |
|---|---|---|---|---|
| 6,099,612 | A * | 8/2000 | Bartos | B01D 46/0005 55/481 |
| 6,249,990 | B1 * | 6/2001 | Tannous | F26B 21/14 34/210 |
| 6,387,164 | B1 * | 5/2002 | Cheng | F24F 3/044 96/66 |
| 6,502,909 | B1 * | 1/2003 | Swilik, Jr. | B01D 46/0002 312/257.1 |
| 6,941,630 | B2 * | 9/2005 | Wynn | F24F 8/10 29/401.1 |
| 7,252,696 | B2 * | 8/2007 | Jenkins | B01D 46/0005 55/481 |
| 7,364,602 | B2 * | 4/2008 | Wu | B01D 46/0005 200/61.51 |
| 8,157,881 | B1 * | 4/2012 | Anoszko | B01D 46/521 55/497 |
| 8,647,405 | B2 * | 2/2014 | Gray, Jr. | B01D 46/0002 55/481 |
| 2002/0184827 | A1 * | 12/2002 | Duffy | F24F 13/02 49/463 |
| 2007/0204575 | A1 * | 9/2007 | Lisbona | B01D 46/10 55/495 |
| 2008/0276806 | A1 * | 11/2008 | Cheng | B01D 46/0006 96/414 |
| 2009/0126679 | A1 * | 5/2009 | Hoffer | F24F 13/28 123/198 E |
| 2010/0180509 | A1 * | 7/2010 | Pridemore | E04F 19/08 49/465 |
| 2010/0313535 | A1 * | 12/2010 | Crook | F24F 8/10 55/502 |
| 2014/0123561 | A1 * | 5/2014 | Chwala | E06B 3/04 49/465 |
| 2016/0003472 | A1 * | 1/2016 | Taylor | F23M 5/025 431/354 |
| 2016/0282000 | A1 * | 9/2016 | Noh | B01D 46/002 |
| 2017/0144093 | A1 * | 5/2017 | Neri | B01D 46/4227 |
| 2018/0185970 | A1 * | 7/2018 | Simmons | F24F 13/084 |
| 2019/0298231 | A1 * | 10/2019 | Grant | A61B 5/1405 |

* cited by examiner

MAGNETICALLY SEALED AIR-CLEANER DOOR

CROSS-REFERENCE TO RELATED APPLICATIONS

This application claims the benefit of the filing date of U.S. Provisional Patent Application No. 62/734,583, which was filed Sep. 21, 2018, the disclosure of which is hereby incorporated by reference herein in its entirety.

TECHNICAL FIELD

The present invention relates generally to heating, ventilating and/or air conditioning systems and, more particularly, to an airtight door for an air cleaner holder.

BACKGROUND

Air cleaners, such as media air filters, are used to protect ductwork and air conditioning systems from dust particles and other contaminants. A variety of air filters are used in heating, ventilating and/or air conditioning (HVAC) systems. A common air filter is a panel filter that uses a spun fiberglass or pleated air filter media. Such filters are relatively inexpensive and provide basic dust protection for ductwork and HVAC system components. Many air filter designs consist of a filter media held by a cardboard frame. Additional support may be provided by a metal screen or cardboard facing, wherein large openings are cut into the cardboard to allow air passage through the filter media. The cardboard facing may be integral to the cardboard frame or may be an additional element of the frame. During use, the air cleaner is typically placed in a frame or holder that aligns the air cleaner with ducting in the HVAC system so that contaminants are removed prior to an air-handling unit.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a device comprises a housing for an air quality component in an HVAC system and a door configured to seal an opening in the housing. The housing may comprise an open first side and an open second side, wherein the openings are configured to be attached to ducting in the HVAC system. A hollow interior of the housing is configured to receive the air quality component so that airflow between the open first side and the open second side flow through the air quality component. An opening to the hollow interior is configured to allow access to the air quality component. The door may comprise a baseplate having a first side and a second side, a gasket attached to the first side of the baseplate, a backplate connected to the second side of the baseplate, and a front plate spaced apart from the backplate by spacers. The baseplate, the backplate and the front plate may be attached by a plurality of fasteners. A plurality of slots may be formed in the baseplate, and a magnet may be positioned in each of the slots.

The opening to the hollow interior may comprise metal, and the door may be held in place by magnetic force between the door and the housing. The air quality component may be, for example, an air cleaner or an air filter.

The fasteners in the door may comprise flush-head studs. The baseplate may comprise a thermoplastic polymer. The backplate, the front plate, and the spacers may comprise a nonmagnetic material, such as aluminum. The baseplate, the backplate, and the gasket may have same height and width dimensions. The baseplate, the backplate, and the gasket dimensions may be adapted to fit within an opening in an air-cleaner housing. The gasket may comprise a cellular urethane and may be attached to the baseplate using an adhesive.

BRIEF DESCRIPTION OF THE DRAWINGS

Figure 1:
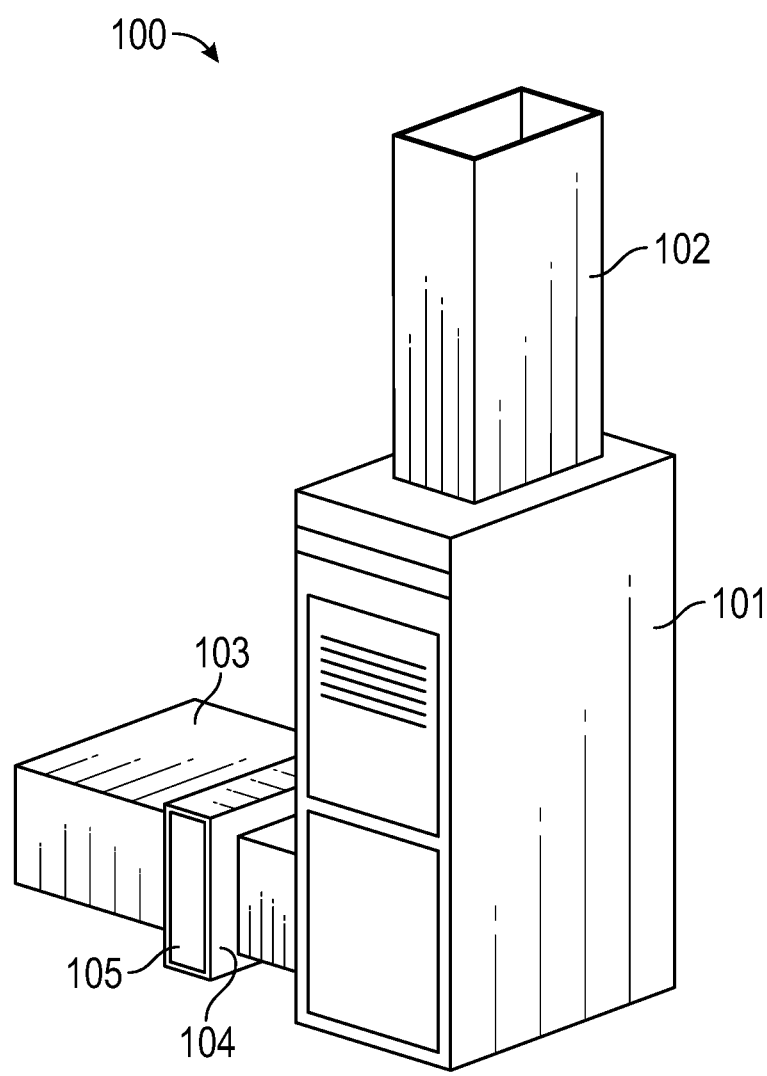

Having thus described embodiments in general terms, reference will now be made to the accompanying drawings, which are not necessarily drawn to scale, and wherein:

FIG. 1 illustrates components of an example HVAC system incorporating an air cleaner housing door as disclosed herein.

Figure 2:
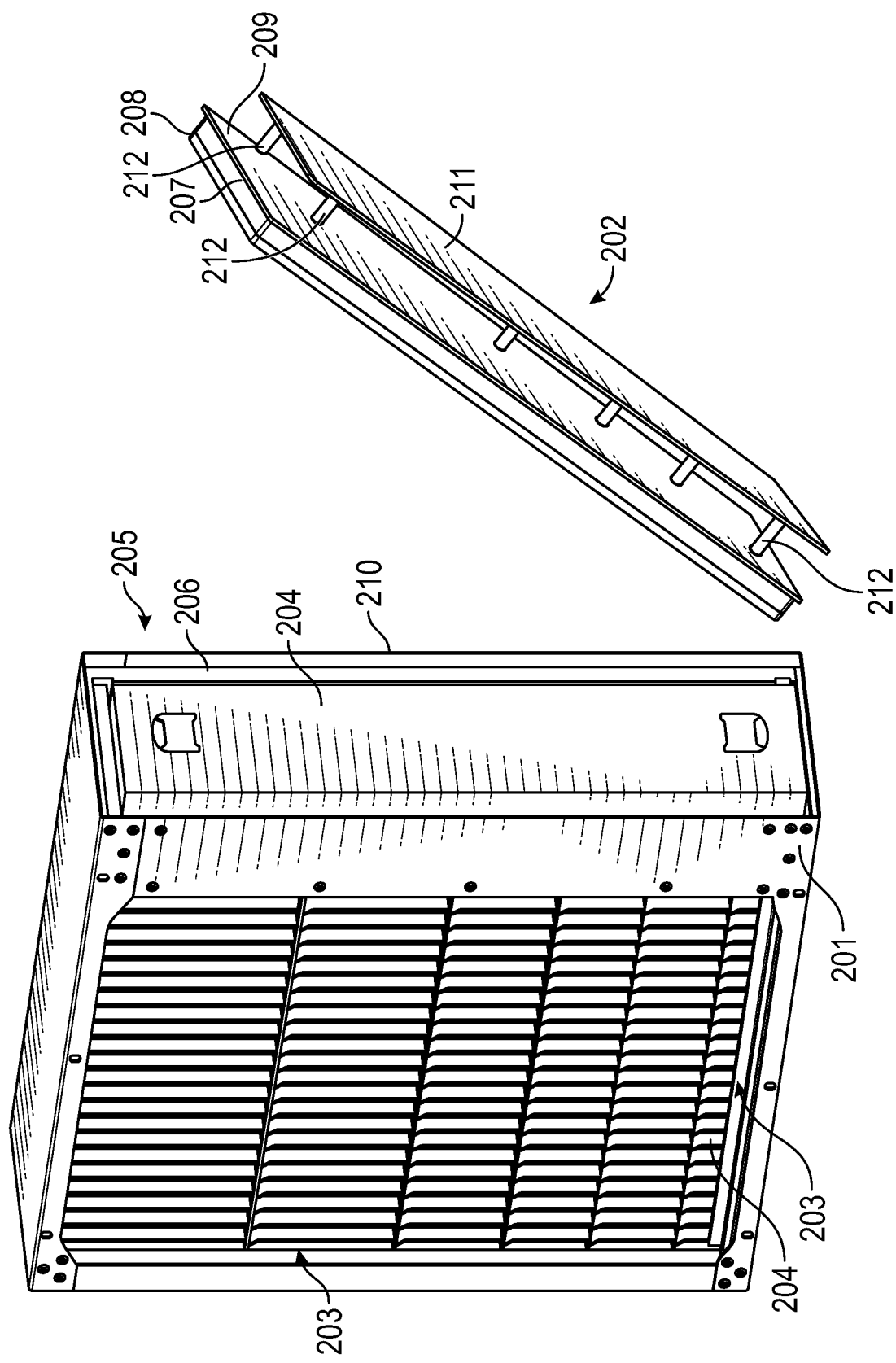

FIG. 2 illustrates an air cleaner housing with a door according to an example embodiment.

Figure 3:
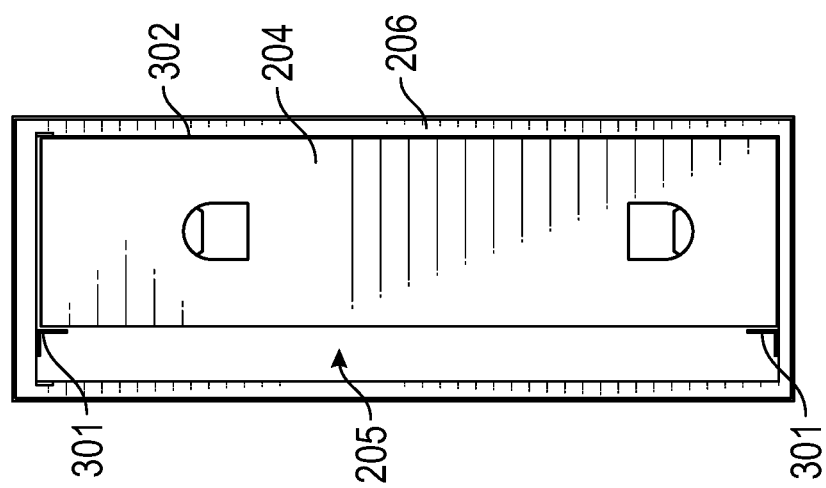

FIG. 3 is a side-view of the air cleaner housing with the door removed.

Figure 4:
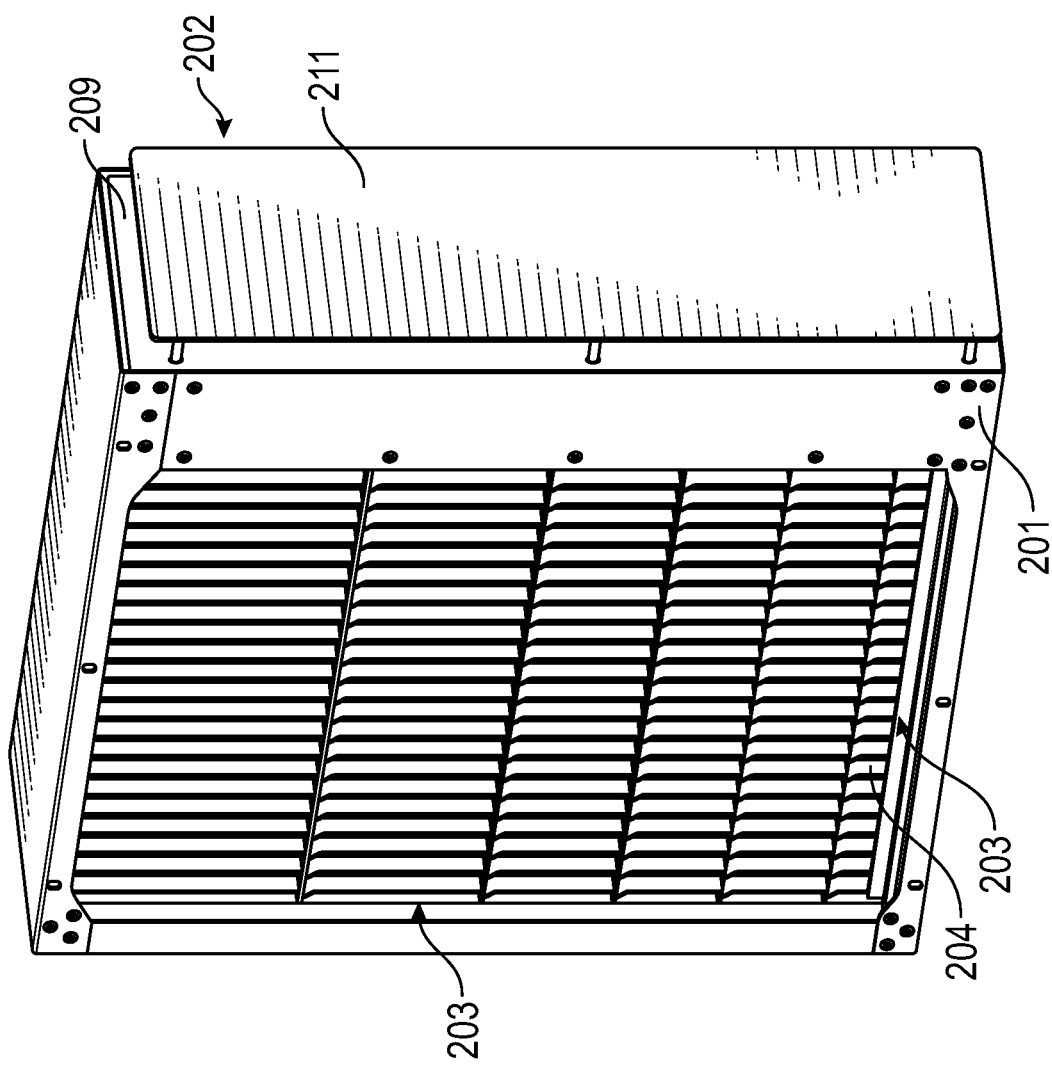

FIG. 4 illustrates air cleaner housing with the door attached.

Figure 5:
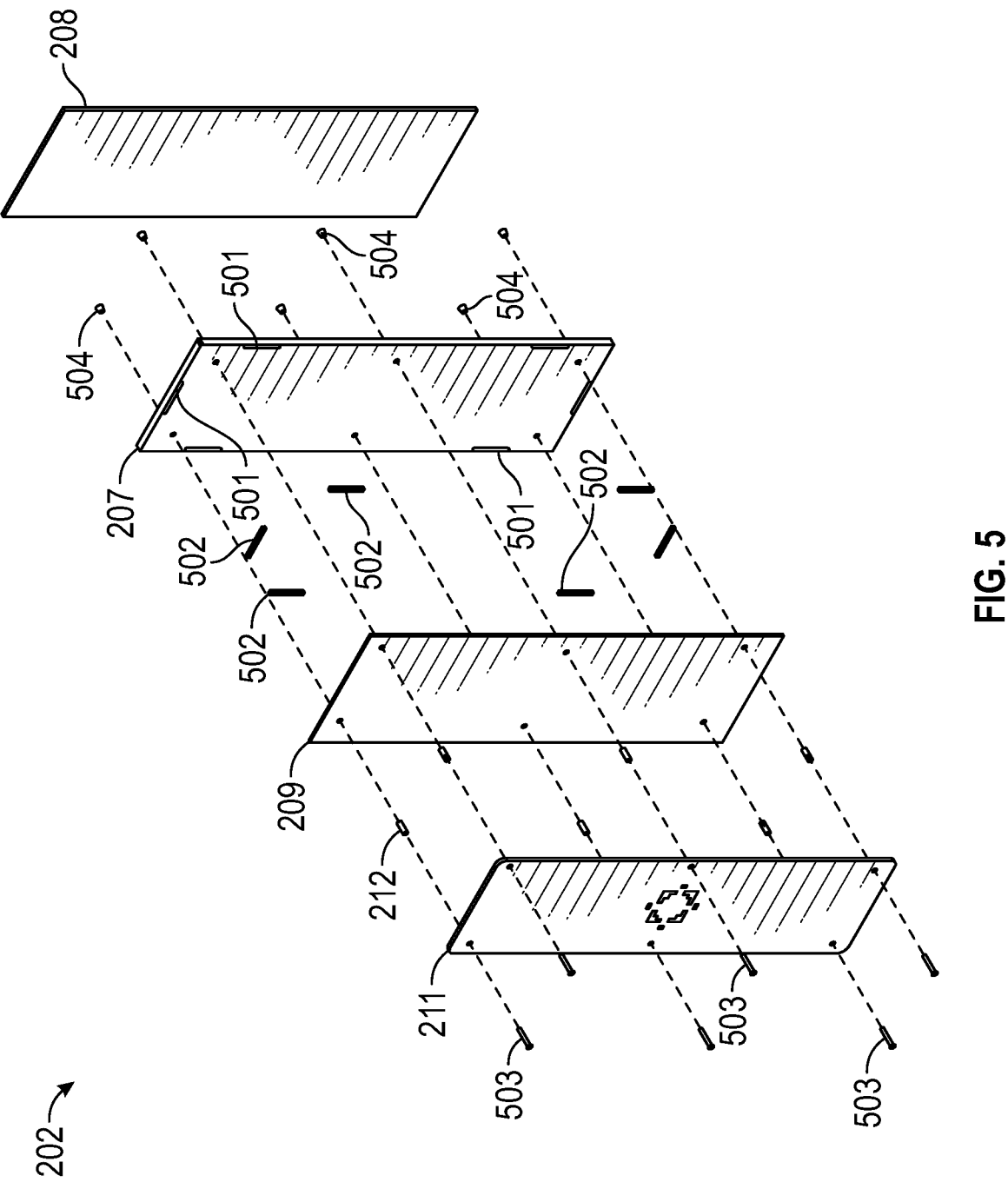

FIG. 5 is an exploded view of an air cleaner housing door.

Figure 6:
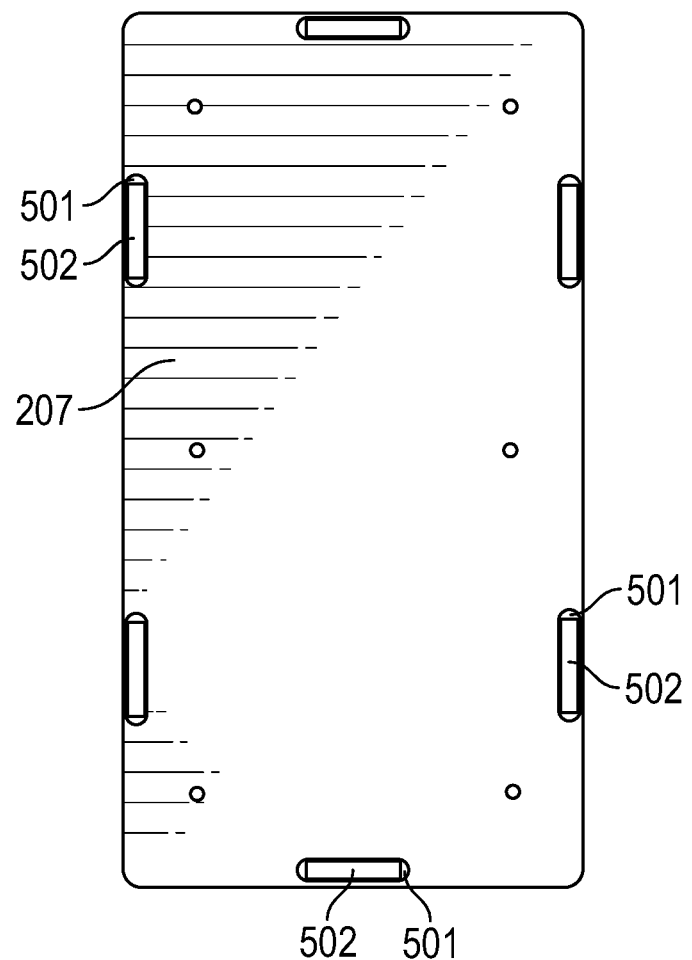

FIG. 6 is a side view of an air cleaner housing door baseplate.

While the apparatus shown in the present application is susceptible to various modifications and alternative forms, specific embodiments thereof have been shown by way of example in the drawings and are herein described in detail. It should be understood, however, that the description herein of specific embodiments is not intended to limit the apparatus to the particular forms disclosed, but on the contrary, the intention is to cover all modifications, equivalents, and alternatives falling within the spirit and scope of the present application as defined by the appended claims.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

FIG. 1 illustrates components of an example heating, ventilating, and/or air conditioning (HVAC) system 100. An air-handling unit 101 contains, for example, a heating element, an evaporator coil, a recirculation blower, humidifier, and/or other components. Heated or cooled air is provided to locations within a building via a supply duct 102, which may branch into different rooms and/or floors in the building. Air is received at air-handling unit 101 via return air duct or plenum 103, which is coupled to return registers or vents in the building. The return duct 103 includes an air cleaner housing 104 that holds an air cleaner, such as a media air filter. The air cleaner may be, for example, a fiberglass or polyester pleated filter, a high efficiency particulate air (HEPA) filter, an electrostatic air filter, or a washable filter. The air cleaner traps airborne debris in HVAC system 100 to help protect indoor air quality. Over time, debris can clog up the air cleaner, which impacts the efficiency of the overall HVAC system. Replacing or cleaning the filter is key to maintaining efficiency for the cooling and heating equipment in air-handling unit 101. A door 105 in air cleaner housing 104 allows a user to install and replace the air cleaner.

To maintain maximum efficiency, the duct network in HVAC system 100 must be a closed system. That means that the supply ducts 102 and return ducts 103 must be completely sealed from the connection at air-handling unit 101 to the registers that pass the heated or cooled air into the building's rooms. A number of air quality problems may arise if the ducts leak, such as poor air quality and increased circulation of dust, dirt and other contaminants in the system. One potential source of duct leaks is air cleaner housing 104 and the door 105, which might not seal properly in existing HVAC systems.

FIG. 2 illustrates an air cleaner housing 201 with a door 202 unattached according to an example embodiment. Air cleaner housing 201 has an opening 203 on each side. Opening 203 is adapted to be connected to a return duct so that return air passes through the air cleaner housing 201 before entering the air-handling unit. An air cleaner 204 fits within air cleaner housing 201. The air cleaner 204 may be sized to fit snuggly within air cleaner housing 201 so that all air entering through one opening 203 is filtered by air cleaner 204 before exiting the other side of the air cleaner housing 201. An opening 205 in one side of air cleaner housing 201 provides access to install and replace the air cleaner 204. Opening 205 has a recessed shoulder 206 running around all sides. Shoulder 206 is positioned to provide a surface to receive door 202 in such a way as to seal air cleaner housing 201. Door 202 prevents air leaks from air cleaner housing 201 and prevents air from bypassing air cleaner 204.

In one embodiment, door 202 fits within opening 205 and attaches to recessed shoulder 206 using magnets. Shoulder 206 and other components of air cleaner housing 201 may be constructed of steel or some magnetic sheet metal. Door 202 comprises one or more embedded magnets that attach to the magnetic recessed shoulder 206 and hold door 202 in place. Door 202 comprises a baseplate 207 with a gasket 208 on one side and a backplate 209 on the other side. Magnets are embedded in baseplate 207 and held in place, for example, by gasket 208 and/or backplate 209. The dimensions (height and width) of the baseplate 207, gasket 208, and backplate 209 are the same so that they form a uniform piece when combined. The thickness of the baseplate 207, gasket 208, and backplate 209 combination may be selected to correspond to the depth of recessed shoulder 206 so that door 202 is flush with an outer edge 210 of opening 205. A front plate 211 may be attached to door 202 and spaced apart from backplate 209 with spacers 212. Front plate 211 may have the same dimensions as the baseplate 207 (and the gasket 208 and backplate 209) or may have smaller dimensions. Front plate 211 may serve as a handle that can be used to install and/or remove door 202. Front plate 211 may be solid or may have material removed in a decorative, weight-reducing, and/or heat-dissipating pattern.

FIG. 3 is a side-view of the air cleaner housing 201 with the door removed. In one embodiment, air cleaner 204 is sized to provide a snug fit top-to-bottom and side-to-side within air cleaner housing 201 but may not be the same width as air cleaner housing 201. In such cases, one or more guides or rails 301 may be attached to air cleaner housing 201 to maintain air cleaner 204 in a desired position flush against one wall 302 of air cleaner housing 201 to eliminate or minimize airflow that bypasses air cleaner 204.

FIG. 4 illustrates air cleaner housing 201 with door 202 attached and held in place by magnetic forces between the magnets within the baseplate and the recessed shoulder component.

FIG. 5 is an exploded view of door 202 according to an example embodiment. Gasket 208 may be, for example, a cellular urethane such as PORON®. Gasket 208 seals and cushions door 202 against air cleaner housing 201, which prevents air leaks in the return duct and eliminates vibration noise or rattling. Gasket 208 may have a Pressure Sensitive Adhesive (PDA) backing that is used to attach baseplate 207 and gasket 208.

FIG. 6 is a side view of baseplate 207, which may comprise, for example, a thermoplastic polymer such as Acrylonitrile Butadiene Styrene (ABS). One or more slots 501 are formed in baseplate 207. The size of slots 501 are selected to receive embedded magnets 502, such as neodymium magnets. Slots 501 are positioned to align with recessed shoulder 206 (FIG. 2) to ensure a secure attachment when door 202 is installed.

Backplate 209, front plate 211, and spacers 212 may comprise, for example, a nonmagnetic metal such as aluminum. Baseplate 207, backplate 209, and front plate 211 may be connected using self-clinching concealed-head studs 503, such as PEM® brand fasteners, and slotted post nuts 504 using holes aligned in each plate.

Although the present embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from this disclosure, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A device comprising:
   a baseplate having a first side and a second side;
   a gasket attached to the first side of the baseplate;
   a backplate connected to the second side of the baseplate; and
   a front plate spaced apart from the backplate by spacers, the baseplate, the backplate and the front plate attached to one another by a plurality of fasteners and is removably-attached to a heating, ventilation, and air conditioning (HVAC) system as a door.

2. The device of claim 1, wherein slots are formed in the baseplate, and wherein a magnet is positioned in each of the slots.

3. The device of claim 1, wherein the fasteners comprise flush-head studs.

4. The device of claim 1, wherein the baseplate comprises a thermoplastic polymer.

5. The device of claim 1, wherein the backplate, the front plate, and the spacers comprise a nonmagnetic material.

6. The device of claim 1, wherein the backplate, the front plate, and the spacers comprise aluminum.

7. The device of claim 1, wherein the gasket comprises a cellular urethane.

8. The device of claim 1, wherein the gasket is attached to the baseplate using an adhesive.

9. The device of claim 1, wherein the baseplate, the backplate, and the gasket have same height and width dimensions.

10. The device of claim 1, wherein the baseplate, the backplate, and the gasket dimensions are adapted to fit within an opening in an air-cleaner housing in the HVAC system.

11. A device, comprising:
 a housing for an air quality component for a heating, ventilation, and air conditioning (HVAC) system, the housing comprising:
  an open first side and an open second side, wherein the open first side and the open second side are configured to be attached to ducting in the HVAC system;
  a hollow interior configured to receive the air quality component so that airflow between the open first side and the open second side flow through the air quality component; and
  an opening to the hollow interior, the opening configured to allow access to the air quality component; and
 a door configured to seal the opening, the door comprising:
  a baseplate having a first side and a second side;
  a gasket attached to the first side of the baseplate;
  a backplate connected to the second side of the baseplate; and
  a front plate spaced apart from the backplate by spacers, the baseplate, the backplate and the front plate attached to one another by a plurality of fasteners.

12. The device of claim 11, wherein slots are formed in the baseplate, and wherein a magnet is positioned in each of the slots.

13. The device of claim 12, wherein the opening to the hollow interior comprises metal, and wherein the door is held in place by magnetic force between the door and the housing.

14. The device of claim 11, wherein the air quality component is an air filter.

15. The device of claim 11, wherein the baseplate comprises a thermoplastic polymer, and wherein the backplate, the front plate, and the spacers comprise a nonmagnetic material.

16. The device of claim 11, wherein the gasket comprises a cellular urethane that seals the door against the housing to prevent air leaks.

* * * * *